WILLIAM D. BROOKS.
Apparatus for Testing Cans, Barrels, &c.
No. 4,796. Reissued March 12, 1872.
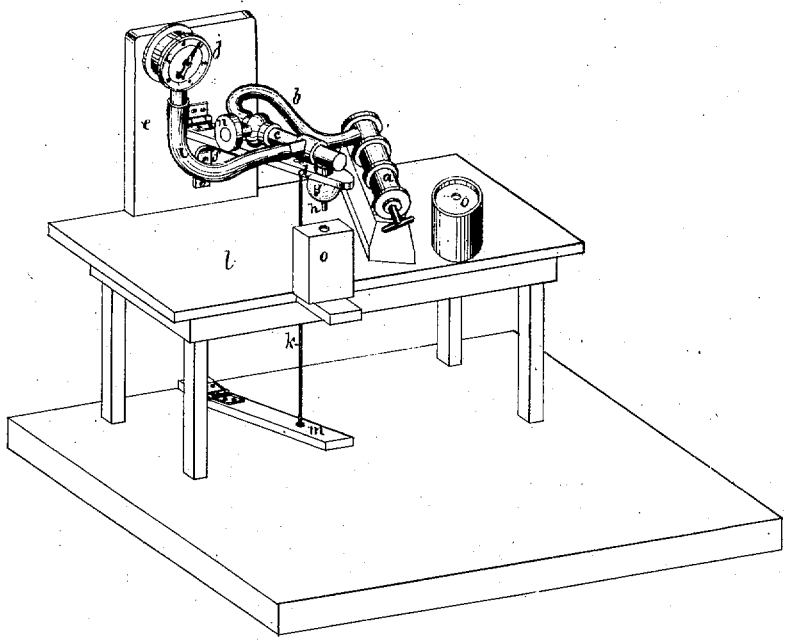
Witnesses:
G. Mathys.
Thos. D. D. Durand
Inventor:
W. D. Brooks.
PER
Attorneys.

UNITED STATES PATENT OFFICE.

WILLIAM D. BROOKS, OF BALTIMORE, MD., ASSIGNOR TO MARY C. BROOKS.

IMPROVEMENT IN APPARATUS FOR TESTING CANS, BARRELS, &c.

Specification forming part of Letters Patent No. 121,581, dated December 5, 1871; reissue No. 4,796, dated March 12, 1872.

Specification describing a new Mode of Testing the Tightness and Strength of Cans, Barrels, and analogous articles, invented by WILLIAM D. BROOKS, of Baltimore, in the county of Baltimore and State of Maryland.

The invention will first be fully described, and then clearly pointed out in the claim.

The drawing is a perspective view, in which the main instrumentalities which embody the principle of my invention are shown, as well as the intermediate and connecting mechanism which I preferably employ.

*a* is an air-pump; *b*, a tube connecting it with a pipe, *c*; *h*, a nozzle attached to said pipe; and *i*, a branch-tube, which leads to a pressure-gauge, *j*. *g* is an elastic ball or valve fitted around the nozzle *h*, and *d* a hinged and spring-retracted lever, fastened firmly on said nozzle so as to support the valve. This lever *d* is provided with a suitable treadle-rod, *k*, and treadle *m*. *l* is a table, and *e* a standard arising therefrom, to which the whole apparatus may be attached. *o* may represent a can placed in position to be tested.

The mode of operation is as follows: The operator depresses the treadle and holds down the valve upon the mouth of the can while he operates the pump to inject air into the can, and also into gauge-chamber. The degree of pressure to which different sizes and kinds of cans must be subjected has been previously ascertained, and the standard varies from a pressure of two to that of twenty pounds. If, upon the injection of air, the gauge-pointer comes up to the standard fixed, the test is successful, the strength and tightness of the can is proved, and it is laid aside as suitable for the trade and purpose intended. If, on the other hand, the pointer should not move from zero, or should move and afterward go back, it conclusively shows the existence of a leak somewhere between the joints of the can. In order to find the exact locality of this leak the flame of a candle is passed along the junction of the parts until the egresss of air is indicated by the outward deflection of the flame.

It is obvious that treadle or other mechanism may be employed to raise the article to the valve, instead of bringing the valve to the article, without deviating at all from the principle of my invention.

I do not desire to claim a force or suction pump, or a gauge, or an elastic valve of any particular construction; but What I do claim as my invention is—

1. The combination of an air-pump, a gauge, and a valve with a connecting mechanism and with means for bringing together said valve and the article to be tested, substantially as and for the purpose described.

2. The arrangement of tube *c*, flexible connection *b c*, and nozzle *h*, in connection with the pump, gauge, and valve, as and for the purpose described.

WILLIAM D. BROOKS.

Witnesses:

ALEX. M. BRISCOE,
W. H. C. WHEELER.